United States Patent
Fichtner et al.

(10) Patent No.: US 7,039,804 B2
(45) Date of Patent: May 2, 2006

(54) METHOD AND SYSTEM TO INTEGRATE EXISTING USER AND GROUP DEFINITIONS IN A DATABASE SERVER WITH HETEROGENEOUS APPLICATION SERVERS

(75) Inventors: Larry George Fichtner, Austin, TX (US); Dah-Haur Lin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 896 days.

(21) Appl. No.: 09/895,230

(22) Filed: Jun. 29, 2001

(65) Prior Publication Data

US 2003/0005297 A1    Jan. 2, 2003

(51) Int. Cl.
G06F 17/00 (2006.01)
(52) U.S. Cl. .................. 713/169; 713/168; 713/150
(58) Field of Classification Search ............... 713/168, 713/200, 201, 202, 189, 150, 169; 709/203
See application file for complete search history.

(56) References Cited

U.S. PATENT DOCUMENTS

2002/0066042 A1* 5/2002 Matsumoto et al. ........ 713/202

OTHER PUBLICATIONS

"Internet Authentication Service for Windows 2000", Jun. 1, 2000, [Retrieved from Internet Feb. 4, 2005], http://www-.microsoft.com/windows2000/techinfo/howitworks/communications/remoteaccess/ias.asp.*
An integrated approach for database security and fault tolerance; Zhang, C.N.; Honglan Zhong; Information Technology: Coding and Computing, 2004. Proceedings. ITCC 2004. International Conference on vol. 1, 2004 Page(s):762-766 vol. 1.*
An Efficient Authentication Scheme with Fault Tolerance for Database Systems; Zhang, C.N.; Chunren Lai; Honglan Zhong; Information Technology and Applications, 2005. ICITA 2005. Third International Conference on vol. 2, Jul. 4-7, 2005 Page(s):448-453.*
Privacy and authentication protocols for PCS; Mohan, S.; Personal Communications, IEEE [see also IEEE Wireless Communications] vol. 3, Issue 5, Oct. 1996 Page(s):34-38.*

* cited by examiner

Primary Examiner—David Jung
(74) Attorney, Agent, or Firm—Duke W. Yee; Jeffrey S. LaBaw; Betty Formby

(57) ABSTRACT

A method and system for sharing existing user and group registry information between heterogeneous application servers is provided. The method and system make use of an adapter that communicates with each registry associated with each application server through a registry communication mechanism. In a preferred embodiment, the present invention provides an additional application-specific database to protect application-specific data that is required for each application server's operation but is not part of an existing database registry. Both the application-specific databases and existing user and group definitions in a user and group registry form a new registry abstraction which is required for each application server. As a result, each application server automatically shares user and group definitions with the existing database server. Furthermore, both the database server and each application server maintain a centralized user and group management model across different application domains.

26 Claims, 8 Drawing Sheets

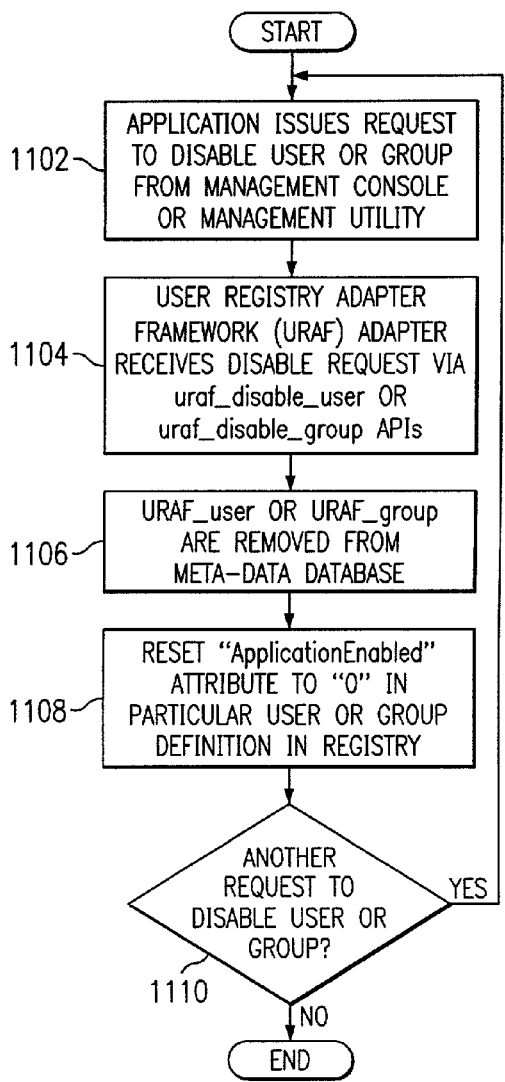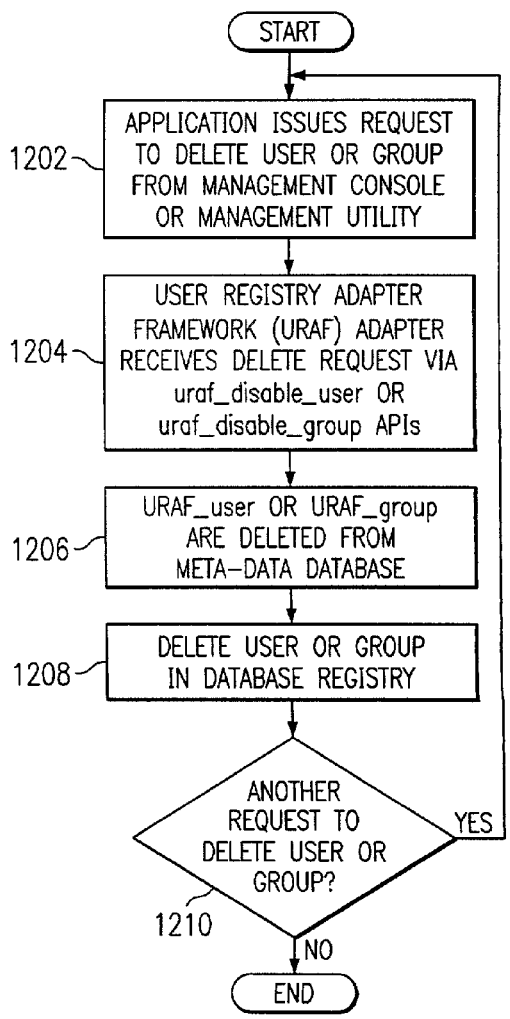

METHOD AND SYSTEM TO INTEGRATE EXISTING USER AND GROUP DEFINITIONS IN A DATABASE SERVER WITH HETEROGENEOUS APPLICATION SERVERS

CROSS REFERENCE TO RELATED APPLICATIONS

The present application is related to co-pending U.S. patent application Ser. No. 09/895,978 entitled "USER REGISTRY ADAPTER FRAMEWORK" filed even date herewith. The content of the above mentioned commonly assigned, co-pending U.S. patent application is hereby incorporated herein by reference for all purposes.

BACKGROUND OF THE INVENTION

1. Technical Field

The present invention is directed to an improved data processing system. More specifically, the present invention is directed to a method and system to share existing user and group definitions in a registry between heterogeneous application servers and allowing heterogeneous applications to access the same user and group definitions amongst the heterogeneous application servers.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

Some Internet-based security systems provide an authorization management solution for corporations to enforce end-to-end protection on web based resources. With end-to-end protection, each user's access to individual web resources can be controlled by a policy or an Access Control List (ACL) attached to those resources independently. These prior art systems enable a user to create a single-sign-on to heterogeneous backend servers, such as, for example, IBM HTTP server and Microsoft Internet Information Server (IIS), and access different web resources based on an individual user's privilege. On the other hand, other systems, such as, for example, a Domino database system provides a distributed client/server database application that enables users to organize, process, track and share information. With later enhancements, a Domino database server also provides an hypertext transfer protocol (HTTP) server, a lightweight directory access protocol (LDAP) server and a Java development environment, these systems have become a powerful and flexible application which advances web-based collaboration throughout a customer's organization.

However, these prior art systems do not provide an integration mechanism between the two systems. While these systems are powerful in their own right, a means of integrating the two systems so that these systems share user and group registry information is desirable. In particular, by integrating these two separate systems, not only would this allow users to obtain features of each system, but would also allow users to benefit from features of both systems simultaneously that enables users to organize, process, track, and share information. Therefore, it would be beneficial to have a method and system for sharing user and group registry information between heterogeneous servers by integrating the heterogeneous servers so that each server can access the other server's registry information.

SUMMARY OF THE INVENTION

The present invention provides a method and system for sharing existing user and group registry information between heterogeneous application servers. The method and system make use of an adapter that communicates with each registry associated with each application server through a registry communication mechanism. In a preferred embodiment, the present invention provides an additional application-specific database to protect application-specific data that is required for each application server's operation but is not part of an existing database registry. Both the application-specific databases and existing user and group definitions in a user and group registry form a new registry abstraction which is required for each application server. As a result, each application server automatically shares user and group definitions with the existing database server. Furthermore, both the database server and each application server maintain a centralized user and group management model across different application domains.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 11 is a flowchart illustrating disabling of a user and a group from an integrated system in accordance with the present invention; and FIG. 12 is a flowchart illustrating removal of a user and a group from an integrated system in accordance with the present invention.

DETAILED DESCRIPTION OF THE PREFERRED EMBODIMENT

The present invention provides a method and system of porting applications to a plurality of platforms. Such porting may be performed in a stand alone computer system or may be distributed across a number of different computing devices in a distributed data processing system. As such, a brief explanation of the distributed data processing system, server devices and client devices is provided to aid in understanding the environments in which the present invention may be implemented.

Figure 1:
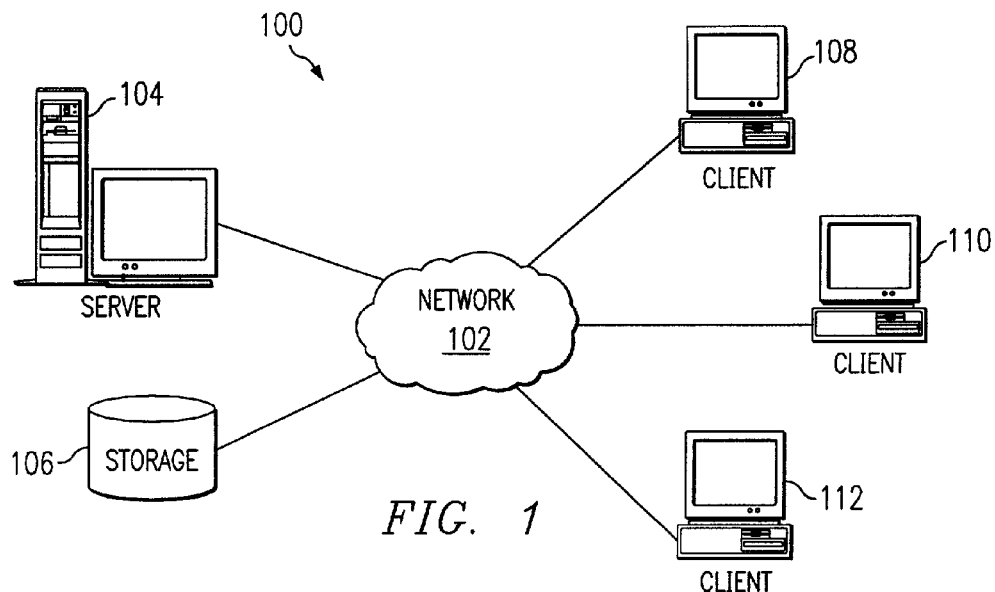
FIG. 1 is an exemplary diagram of a distributed data processing system in accordance with the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
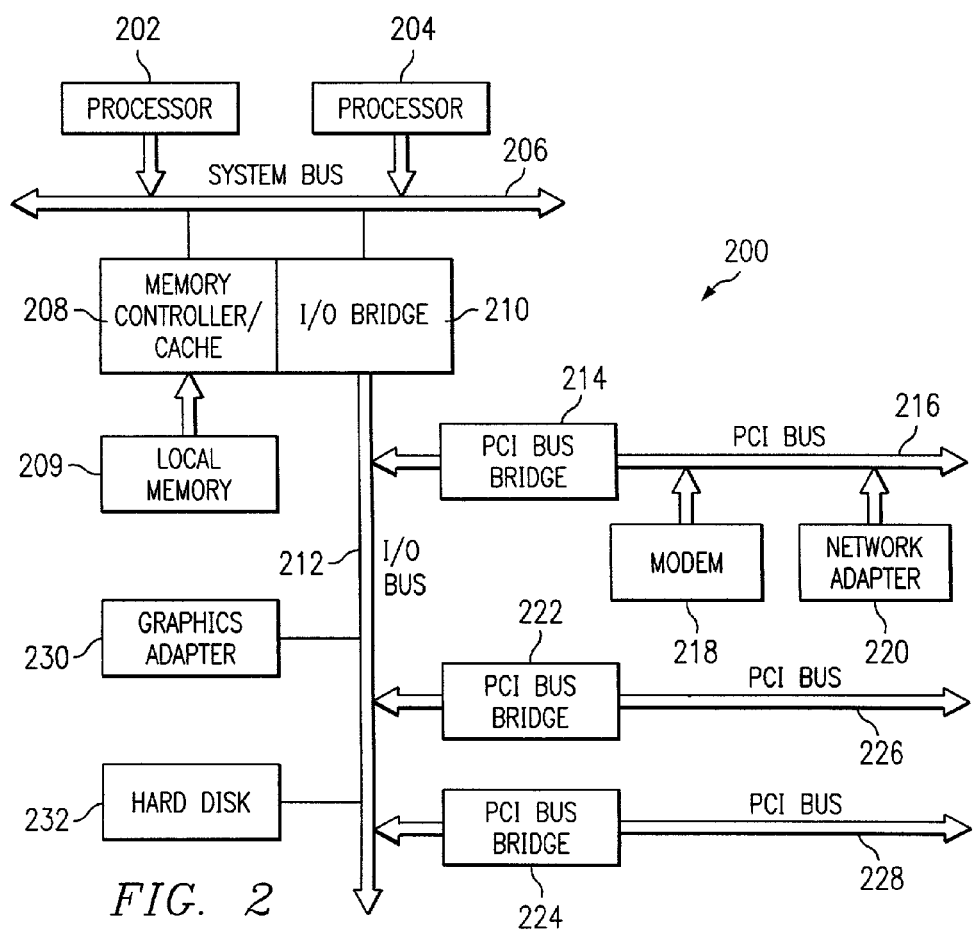
FIG. 2 is an exemplary diagram of a server device in accordance with the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
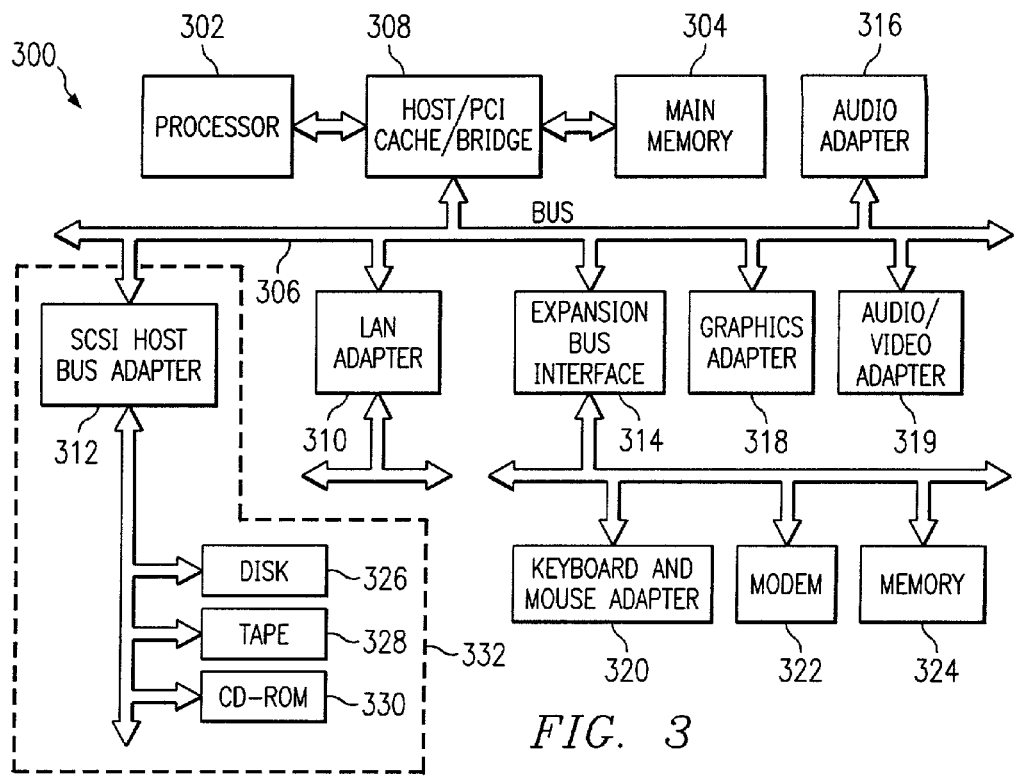
FIG. 3 is an exemplary diagram of a client device in accordance with the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As mentioned above, the present invention provides a method for sharing user and group registry information between heterogeneous application servers. When sharing user and group registry information on heterogeneous servers, it would be most efficient to be able to share the same user and group registry information across all applicable servers. By using the present invention, features of all the heterogeneous application servers are combined while allowing information specific to each server to be protected from users which are not authorized to access to the data amongst different application servers.

One way in which to provide such ability is to have an adapter that can be used to integrate the heterogeneous application servers in a way in which each server sees the other server as part of an overall system. The present invention provides such an integration function and a method for using this integration function to facilitate the sharing of user and group registry information across the adapter.

Figure 4:
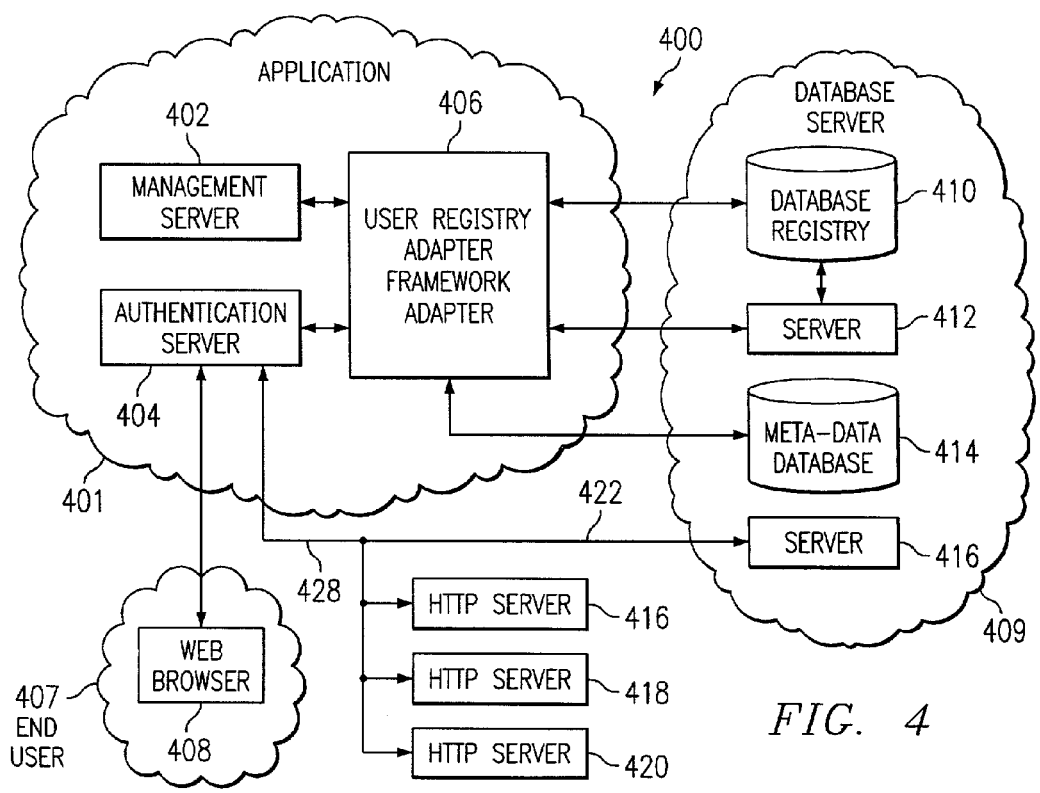
FIG. 4 illustrates an example of an integration between servers in accordance with the present invention.

FIG. 4 illustrates an example of an integration between servers in accordance with the present invention. A goal for integration is to allow a user of a first server to perform a Web single-sign-on to various backend HTTP servers through application 401. By using this process, an administrator may be able to set access policy to resources in a common object name space for users of database server 409.

From a user registry management perspective, there may be two scenarios to create a new user and group in integrated environment 400. The first scenario is to create a new user and group during the creation of application 401. For newly created users and groups after configuration of application 401, all user and group objects will be created directly into database registry 410. For existing user and groups created in database registry 410 by database server 409, these users and groups may be imported and thereby allowing these existing user and groups to become users and groups of application 401. For either newly created users and groups and existing imported users and groups, application 401 and database server 409 may share the same user and group definition in database registry 410. Secondly, through an "import" operation provided by a management utility program, for example, management server 402, in application 401, existing users and groups of database server 409 may become the users and groups of application 401.

From a perspective of database server 409, the existing users and groups of server 409 can be highlighted through a specific attribute of application 401 which may be defined in user and group definitions in database registry 410. An example of a specific attribute of application 401 may be a hidden "ApplicationEnabled" field added in user and group documents in, for example, a "Domino" Public Address Book (PAB) database. In a "Domino" server, the Public Address Book database is the "Domino" server's user registry which is located within the "Domino" server.

Figure 5:
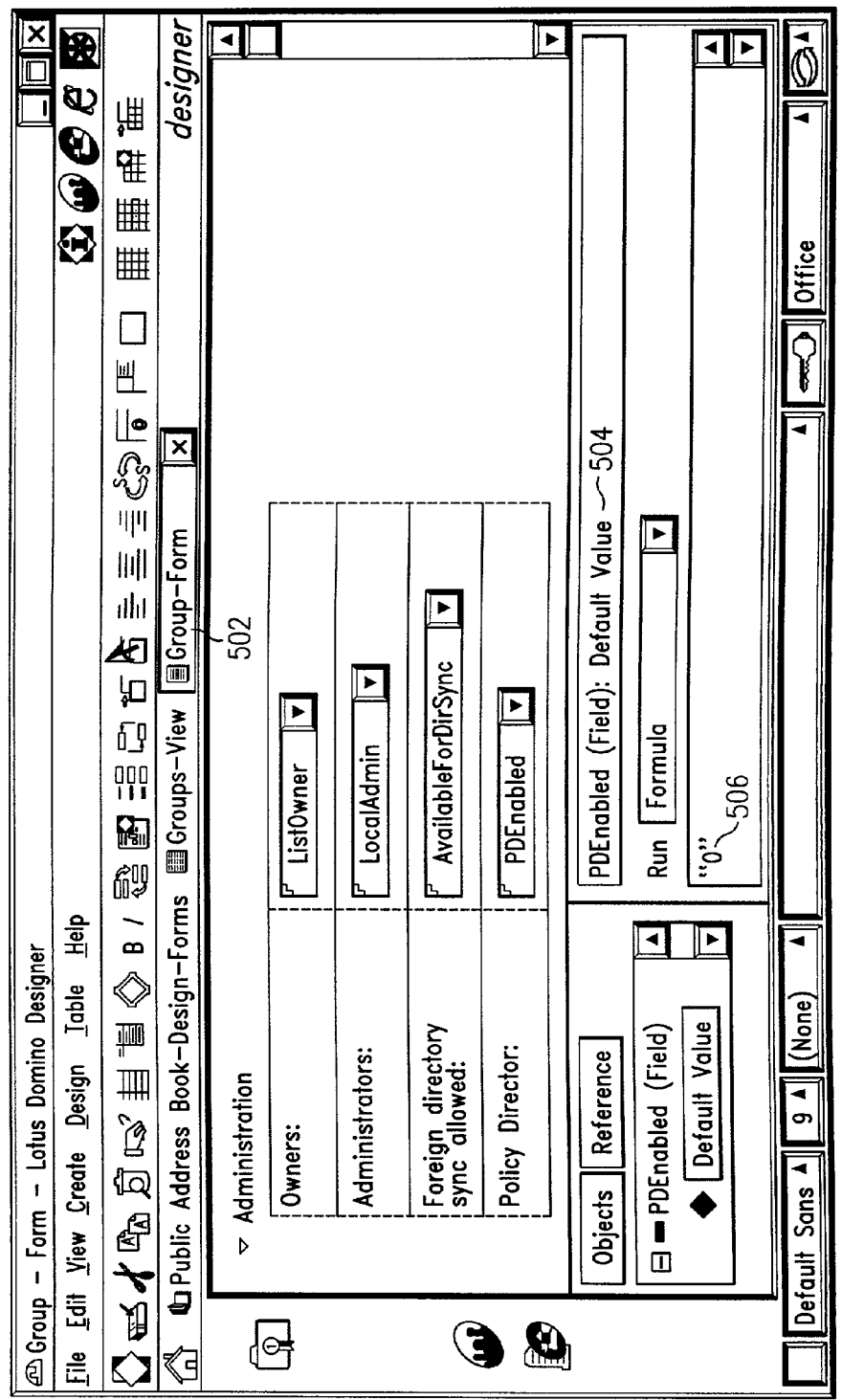
FIG. 5 is a graphical user interface illustrating a process of adding an application-specific attribute to existing user and group definitions of a database server in which the application is enabled to access both a registry of the database server and a application-specific database located within the database server in accordance with the present invention.

In an alternate embodiment, an administrator of database server 409 may, based on a value within the "ApplicationEnabled" field, create an associated representation field in both the user and group form, which is the format of the user and group definition in database registry 410. By adding this representation, the definition of users and groups will demonstrate an association between database server 409 and application 401 for each user and group though a graphical user interface (GUI) associated with database server 409. This graphical user interface is shown in FIG. 5. An example of this GUI shown in FIG. 5 displays a "Domino" user being enabled to also become a "Policy Director" application user using a "PDEnabled" attribute field.

For application 401, both newly created users and groups and imported users and groups may appear on a management console for application 401 to allow the administrator to perform access policy administration tasks on the common object space for backend server resources in servers 416, 418 and 420. Furthermore, the administrator may also set up a single-sign-on credential 428 for each user of application 401 to access various backend HTTP servers 416, 418 and 420. All operations with a user registry will all be performed through adapter 406.

Once the administrator has completed all management tasks within server 409, user 407 of application 401 may then issue a request to access, for example, a Web resource through Web browser 408 in one of the resource object spaces of HTTP servers 416, 418, and 420. Upon receiving the request, authentication server 404 may prompt a user of database server 409 for an Internet identification and password. The Internet identification and password of the user of database server 409 is used to authenticate the user to database registry 410 associated with database server 409 through a logical device address protocol (LDAP). If the authentication is successful, authentication server 404 will, based on the user's unique identity information and group membership identity information contained in the application-specific database 414, form an application 401 internal credential for the user. The credential will then be used by application 401 to check authorization against the requested resource. In order to guarantee the security of the resource, the user and group data associated with application 401 in meta-data database 414 are protected against any unauthorized access by servers in application 401. If access is allowed to application 401, authentication server 404 will then use a programming interface provided by a URAF adapter to obtain a single-sign-on resource credential for the user and submit the single-sign-on resource credential to one or more backend HTTP servers 416, 418 and 420 for accessing a protected Web resource. Upon completion of the authorization to one or more HTTP backend server 416, 418 and 420, the requested Web resource will be transmitted to the user.

FIG. 5 is a graphical user interface illustrating a process of adding an application-specific attribute to existing user and group definitions of a database server in which the application is enabled to access both a registry of the database server and a application-specific database located within the database server in accordance with the present invention. To allow application 401 in FIG. 4 to be able to demonstrate an association with database server 409 in defined user and group documents in database registry 410 a mechanism is needed in order to indicate the association. This mechanism is supplied by adding a new field, such as, "PDEnabled" field 504 to existing group document 502 in database registry 410 shown in FIG. 4. A value of "PDEnabled" field 504 may contain either a "0" value or a "1" value. A "0" value may indicate that the association is not enabled and a "1" value may indicate that the association is enabled. In this example, initial value 506 may be set to "0".

As a default, "PDEnabled" field 504 which is created in group document 502 may be only updated by an authorized identity in application 401 via a URAF adapter, such as, adapter 406 in FIG. 4. The association field will not be displayed via database server 409 native management GUI automatically. However, if an administrator associated with database server 409 decides to present this association through a native GUI of server 409, the administrator may accomplish presentation based on "PDEnabled" field 504 to create a presentation field in group form 502 in database registry 410 in FIG. 4. FIG. 5 is an example of a field's presentation.

When adding the presentation field, the presentation field will be added to a public access template in database registry 410 because most installations of database servers like server 412 in FIG. 4 may retain a public access template as the master design of group document 502. However, if the database server installation no longer uses the public access template to define a design of group document 502, the presentation field may be added directly to group form 502. The presentation field may open, for example, a group's form definition document and add a new field to the document. The placement of the presentation field may vary depending on the layout of group form 502. When adding the presentation field to, for example, a user form (not shown), the process may be the same as adding the presentation field to group form 502.

Figure 6:
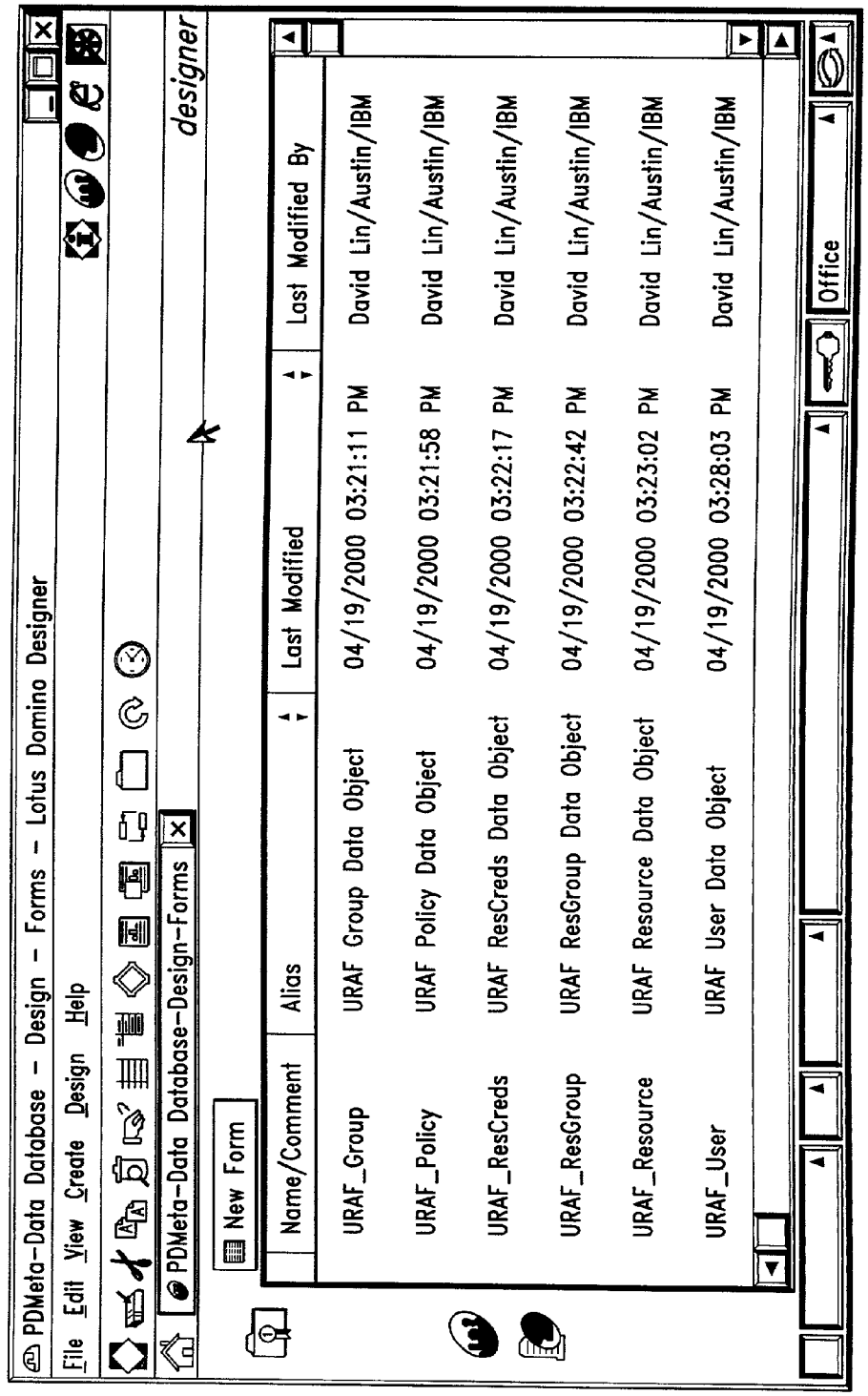
FIG. 6 illustrates a graphical user interface for design of an application-specific meta-data database in accordance with the present invention.

FIG. 6 illustrates a graphical user interface for design of an application-specific meta-data database in accordance with the present invention. FIG. 6 is an example of defining URAF primary data objects using, for example, a "Domino" server database's form. In order to store and protect an individual application's private and critical data in one application, such as application 401 in FIG. 4, database 414 is created within, for example, database server 409. In addition, database 414 may be replicated to a client machine in order to take performance advantages. With the database replicated in the client machine locally, constructing an application internal credential will be fast and more efficient.

Database 414 may be designed to contain all primary data object definitions in an adapter, such as, adapter 406 in FIG. 4. The primary data objects, in this case, are application specific users, groups, policies, and the like. Some of these primary data objects may have reference fields pointing to user and group documents residing on a registry of the database server, such as, for example PAB database 410 in FIG. 4. In order to protect data within meta-data database 414 in FIG. 4 from being read by unauthorized users (users not authenticated to access the integrated system), an access control list of meta-data database 414 may be set to allow authorized identities of servers in application 401 and the administrator of database server 409 to perform read/write/modify operations to data within meta-data database 414.

In an integration environment between heterogeneous application servers, such as application 401 and database server 409 in FIG. 4, a URAF programming interface user may have no knowledge about which piece of data is stored in which database in database server 409. All data operations will be shielded by the URAF adapter implementation. As a general rule, all the data that application 401 needs, which does not store in database registry 410, will be stored in meta-data database 414. Specifically, user data that is stored and used by application 401 in a user's document may include the user's first name, middle name, last name, "PDEnabled" value, application 401 user's sign on identification, and the user's Internet password. For a group form, such as, group form 502 in FIG. 5, group data stored in registry database 410 may include the value in the "PDEnabled" field, group membership list and application 401's group name. Any remaining data associated with a user or group form may be stored in application's meta-data database 414.

Figure 7:
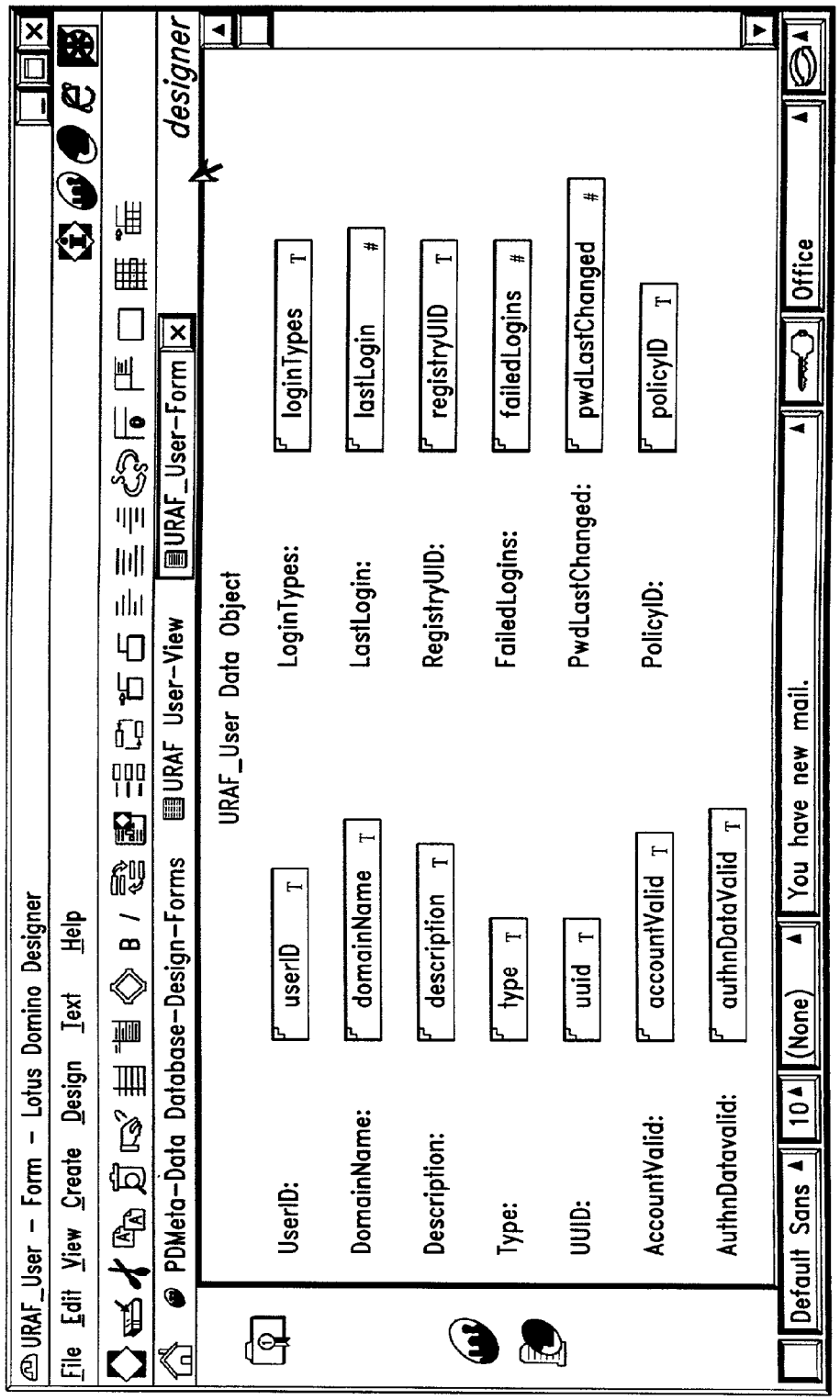
FIG. 7 illustrates a graphical user interface containing examples of field attributes contained in a URAF user object in accordance with the present invention.

FIG. 7 illustrates a graphical user interface containing examples of field attributes contained in a URAF user object in accordance with the present invention. Each URAF primary object may be designed as a form in database registry 410 in FIG. 4 where each data attribute defined in a primary data object is represented as a "field" in the form. Data context of each "field" may be assigned as either one of the default types, such as, text, number and the like, or an equivalent type in database server 409, for example, UserData type to store binary contents), based on the definition of each data attribute. An example of field attributes contained in a URAF_User object is shown in FIG. 7. These fields will be used to store real data values.

In a normal database server 409 environment, defined forms may be used as an input vehicle to provide data to individual URAF data objects through database server 409 native GUI or a Web-based GUI. In the integrated environment between heterogeneous servers, however, usage of a form document to perform data input to the URAF objects is prohibited. The reason that this is prohibited is because many attribute value in each URAF data objects are generated by internal processes in URAF implementation during application 401 registry related operations, such as create user and group objects. Therefore, once application 401 is being installed in the environment of database server 409, management operations associated with application 401 may be required to be initiated from the management console provided by application 401 or a management utility. All management operations for application 401 are not recommended to be performed from database server 409's GUI or server 409's Web based GUI because it may create data inconsistency from a perspective of application 401.

Figure 8:
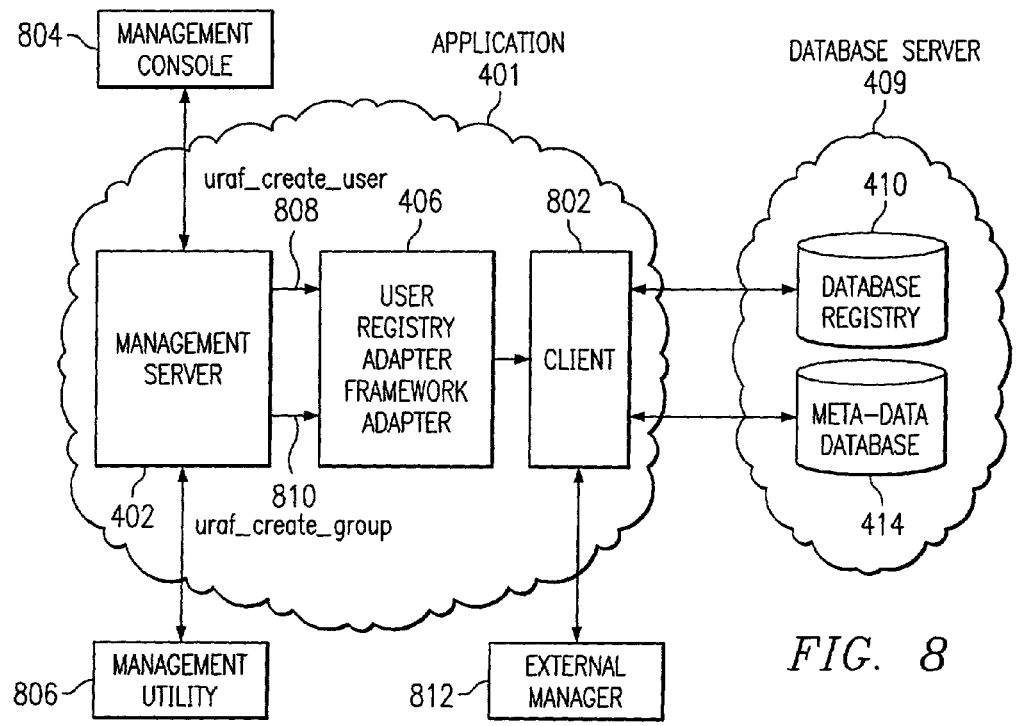
FIG. 8 is an illustration of creating and enabling users and groups within a database server in accordance with the present invention.

FIG. 8 is an illustration of creating and enabling users and groups within a database server in accordance with the present invention. When a command is initiated from management console 804 to create a new user and group which does not exist in database registry 410, management server 402 in application 401 may issue a URAF call, for example, uraf_create_user 808 or uraf_create_group 810, to adapter 406. Internally, URAF adapter under the covers will attempt to create a new user and group for database server 409 in database registry 410 using client 802. For the new user creation, a last name, a middle name, and a first name will be input in a user document and a combination of a user identification and domain name will be added to a "short name" field, a "ApplicationEnabled" field of the user document will be updated with the appropriate value as explained in FIG. 5 and an Internet password of the user will be created in the user document in registry database. The short name, in this case, may be used as the user's login name for application 401, and the password is database server 409's Internet password for the user. Similarly, a combination of application 401 group identification and domain name may be added to "group name" field in a newly created group document. With successful creation of database server 409 user and group, adapter 406 will then create an associated application 401 meta-data in database 414. All user and group creation operations may be performed under application 401's privilege user identity. By using supported commands in management utility 806 in application 401, an "import" command allows an administrator to activate user and group objects created by database server 409 in the same registry and be able to become a user and group of application 401. Following a similar concept as with adding new users and groups described above, management utility 806 allows an administrator to issue an "import" command through the utility to enable existing users and groups in database server 409 to become users and groups in application 401. Management server 402 in application 401 will receive an "import" command issued from management utility 806 to call uraf_enable_user or uraf_enable_group applications program interfaces (APIs). During the "import" operation, adapter 406 may first associate the user and group to application 401 by setting an "ApplicationEnabled" field in that user or group document associated with the user or group attempting to be enabled. All application 401 meta-data that are associated with the newly enabled user or group will be stored in meta-data database 414. After the user or group is either created or enabled, this user or group will be displayed on the management console of application 401 so that an administrator may perform tasks associated with application 401.

Figure 9:
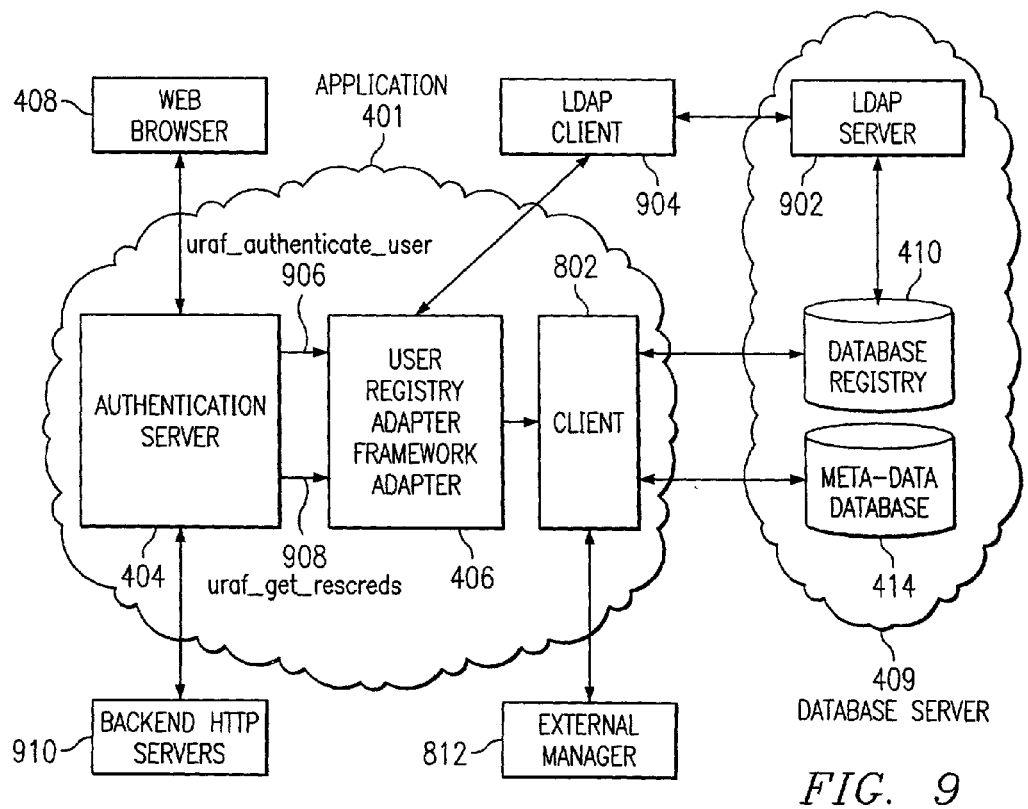
FIG. 9 is an illustration of performing a single-sign-on in an integrated system in accordance with the present invention.

FIG. 9 is an illustration of performing a single-sign-on in an integrated system in accordance with the present invention. As stated previously, a main focus of the present invention is to provide a database server the capability of performing a Web single-sign-on to various backend HTTP servers via a second application. In order for this function to be enabled, resource credential mapping capability may be used to provide this goal. Essentially, a resource credential will be used to store the user's identity and password for signing on to a particular backend HTTP server. Resource, ResGroup and ResCredes data objects which are designed in the URAF architecture may allow an administrator to map a specific application's user identification and password to one or more multiple backend HTTP servers 910 that require basic authentication sign-on credentials. With an administrator's single-sign-on object settings, the Web single-sign-on operation may take place automatically through an authentication component when a user in database server 409 in FIG. 4, requests access to a Web resource in the authentication server's, such as authentication server 404 in FIG. 4, common object spaces. The administrator may set up one URAF_Resource object for each backend HTTP server. Then based on each HTTP backend server's sign-on credentials for each user or group, the administrator may create an associated URAF_ResCreds to map application 401 user identity to the backend HTTP server's user identity. User identity (UID) ID and authenticated data (AuthnData) attributes may be contained in the URAF_ResCreds object and used to sign on to backend HTTP server 910. Authentication server 404 will be based on the location of the web resource requested to find the URAF_ResCreds associated with the user and provide the contents of UID and AuthnData to the backend HTTP server. As a result, the authentication server signs onto backend HTTP server on behalf of the user.

Figure 10:
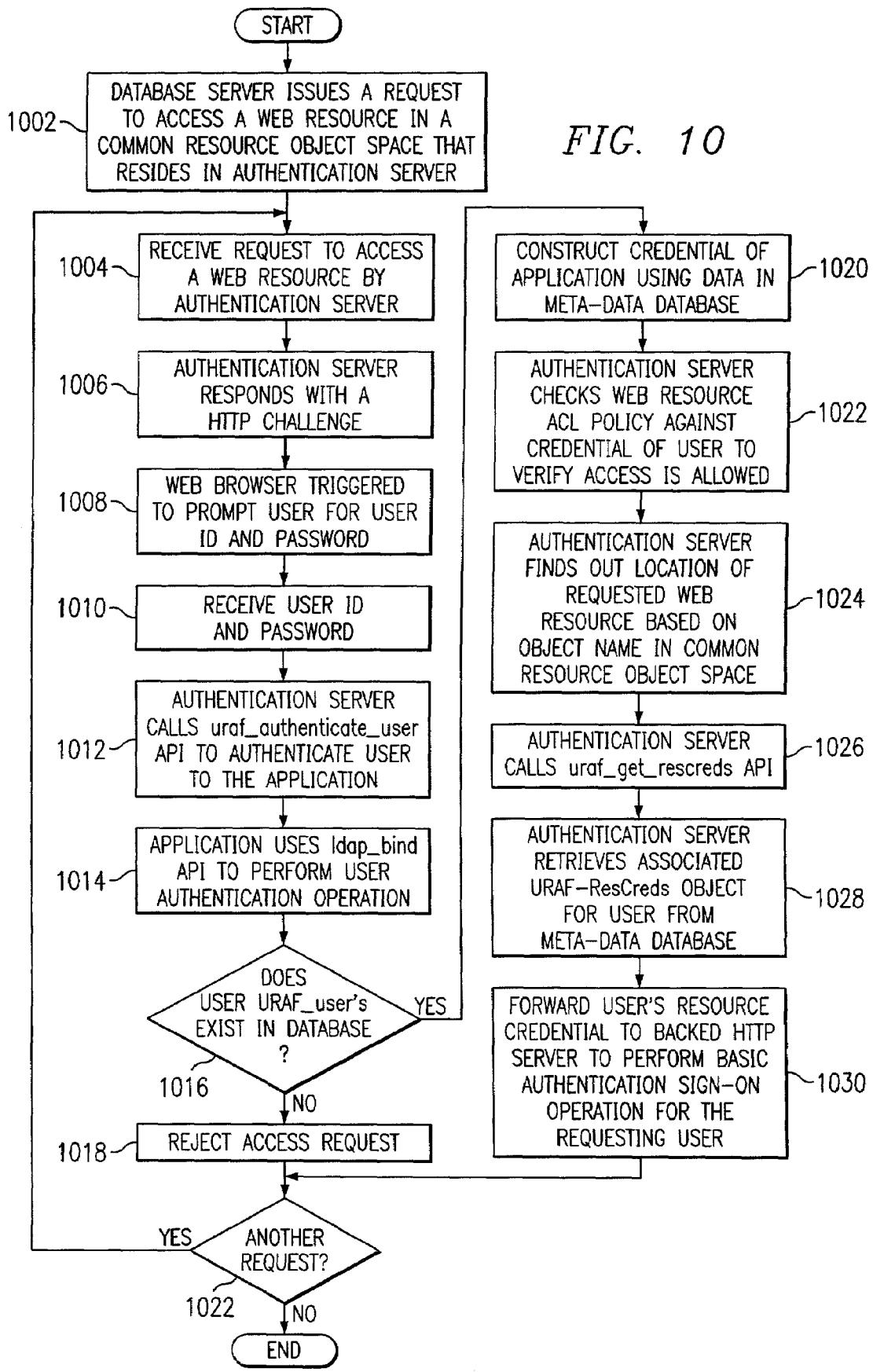
FIG. 10 is a flowchart illustrating a flow of a single-sign-on operation in an integrated system in accordance with the present invention.

FIG. 10 is a flowchart illustrating a flow of a single-sign-on operation in an integrated system in accordance with the present invention. FIG. 10 is a further illustration of a single-sign-on process in FIG. 9. In this example, the operation starts by a database server issuing a request to access a Web resource in the common resource object space that resides in the authentication server (step 1002). The request to access the Web resource is received by the authentication server (step 1004). The authentication server responds to the request with a HTTP challenge (step 1006).

A HTTP challenge is to ask for user's valid id and password to access to the protected resource. A web browser is triggered to prompt for a user for a userID and a password (step 1008). The userID and the password are received (step 1010). The authentication server then calls a uraf_authenticate_user API to authenticate the user to an application (step 1012). The URAF adapter in the application uses a ldap_bind API to perform a user authentication operation (step 1014). Then a determination is made as to whether or not the user's URAF_user exists in the application-specific meta-data database (step 1016). If the user's URAF_user does not exist in the application-specific meta-data database (step 1016:NO), the access request is rejected (step 1018). Then a determination is made as to whether or not another request has been received (step 1022). If another request has been received (step 1022:YES), the operation returns to step 1004 in which the request to access a Web resource is received for accessing to a web resource in the common resource object space resided in the authentication server of the application. If another request has not been received (step 1022:NO), the operation then terminates.

Returning to step 1016, if a user's URAF_user does exist in the application-specific meta-data database (step 1016:YES), an internal credential of the application is constructed using the data in the meta-data database (step 1020). The authentication server of the application then checks the requested Web Resource's ACL policy against the internal credential of the user to verify if access is allowed for the user (step 1022). The authentication server of the application then finds a location of the requested Web resource based on an object name in the common resource object space (step 1024). The authentication server then calls a uraf_get_rescreds API in the URAF adapter (step 1026). The authentication server retrieves the associated URAF_ResCreds objects for the user from the meta-data database (step 1028). The user's credentials for the backend server is then forwarded to that backend HTTP server to perform a basic authentication sign-on operation on behalf of the user (step 1030). Then a determination is made as to whether or not another request has been received (step 1022). If another request has been received (step 1022:YES), the operation returns to step 1004 in which a request to access a Web resource is received in the authentication server of the application. If another request has not been received (step 1022:NO), the operation then terminates.

FIG. 11 is a flowchart illustrating disabling of a user and a group from an integrated system in accordance with the present invention. In performing the disable operation of a user and a group from the integrated system, this disable operation will clean up all URAF_User and URAF_group objects associated with the user and the group in the metadata database 414 of FIG. 4, however the definitions of the user and the group in the database registry 410 in FIG. 4 will remain unaffected in the database server. After the uraf_disable_user or uraf_disable_group URAF API calls are successful, the users and groups that still exist in the database server will not be able to take advantage of the functions provided by application 401.

In FIG. 11, the operation begins by an application issuing a request to disable a user or a group from either a management console or a management utility (step 1102). A user registry adapter framework (URAF) receives the disable request via a uraf_disable_user API for a user or a uraf_disable_group API for a group (step 1104). Under a URAF adapter implementation, the URAF_User object or URAF_group object will be removed from the meta-data database (step 1106). Then an "ApplicationEnabled" attribute in either a user or a group document in the database registry will be reset to "0" (step 1108). By setting the attribute to "0" in the database registry, the user or the group will not be able to access the application. A determination is made as to whether or not another request has been made to disable a user or group (step 1110). If another request has not been made to disable a user or group (step 1110:NO), the operation terminates. If another request has been made to disable a user or group (step 1110:YES), the operation returns to step 1102 in which an application issues a request to disable a user or a group from a management console or a management utility.

FIG. 12 is a flowchart illustrating removal of a user and a group from an integrated system in accordance with the present invention. Removal of a user and a group from the integration system will delete both URAF_User and URAF_group objects in a meta-data database and user and group definitions in a database registry. As a result, user and group data will no longer exist in both the application and the database server 409.

In FIG. 12, the operation begins by an application issuing a request to delete a user or a group fro a management console or a management utility (step 1202). A user registry adapter framework (URAF) receives the delete request via a uraf_delete_user API for a user or a uraf_delete_group API for a group (step 1204). A URAF_user or a URAF_group are deleted from a meta-data database (step 1206). Data associated with the user or group is then deleted in a database registry (step 1208). A determination is then made as to whether or not there is another request to delete another user or group (step 1210). If there is not another request to delete a user or a group, (step 1210:NO), the operation terminates. If there is another request to delete a user or a group (step 1210:YES), the operation returns to step 1202 in which an application issues a request to delete a user or a group from a management console or a management utility.

Therefore, the present invention provides a method for sharing user and group registry information between heterogeneous servers by integrating the heterogeneous servers so that each server can access the other server's registry information. The present invention integrates multiple systems so that these systems share user and group registry information. By integrating these multiple separate systems, this allows users to obtain features of each system and also allows users to benefit from features of both systems simultaneously that enables users to organize, process, track, and share information.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for sharing registry information among a plurality of heterogeneous servers, comprising the steps of:

creating a database registry such that registry information is separated into first registry information that is common to a plurality of applications running on said plurality of heterogeneous servers and second registry information that is specific to ones of said plurality of applications, wherein said first registry information is stored in a common registry and said second registry information is stored in respective second registries associated with respective applications;

responsive to receiving a request to authenticate a user in said database registry, constructing a credential of the user; and selectively allowing access to a resource based on the credential of the user and a protection policy applied to the resource in an object name space associated with a first server of said plurality of users.

2. The method as recited in claim 1, wherein the said credential of the user is constructed using a user identifier and a user password.

3. The method as recited in claim 1, wherein registry information in said database registry includes at least one of user registry information and group registry information.

4. The method as recited in claim 1, wherein access to the database registry must go through an adapter.

5. The method as recited in claim 4, wherein the adapter is a user registry adapter.

6. The method as recited in claim 1, further comprising: storing a definition of the user in said database registry.

7. The method as recited in claim 1, further comprising the step of protecting application specific data from unauthorized users.

8. The method as recited in claim 1, wherein said respective second database is a meta-data database.

9. The method as recited in claim 1, wherein the resource is a Web resource.

10. The method as recited in claim 1, further comprising: responsive to a request to disable a user from accessing a given resource, receiving the disable request at an adapter integrating the plurality of servers; and removing a definition associated with the user from a database associated with the second server.

11. The method as recited in claim 1, further comprising: responsive to a request to disqualify a user from accessing a given resource, receiving the disqualification request at an adapter integrating the plurality of servers;

removing a definition associated with the user from a first database associated with the second server; and removing a definition associated with the user from a second database mandated with the second server.

12. The method as recited in claim 11, wherein the first database is a registry database and the second database is a meta-data database.

13. A system, comprising:
a bus system;
a memory, including a set of instructions, connected to the bus system; and a processing unit, connected to said memory and to a database registry constructed such that registry information is separated into first registry information that is common to a plurality of applications running on said plurality of heterogeneous servers and second registry information that is specific to ones of said plurality of applications, wherein said first registry information is stored in a common registry and said second registry information is stored in respective second registries associated with respective applications;

responsive to receiving a request to authenticate a user in said database registry, constructing a credential of the user; and selectively allowing access to a resource based on the credential of the user and a protection policy applied to the resource in an object name space associated with a first server of said plurality of servers.

14. A system for integrating a plurality of servers, comprising:

a database registry constructed such that registry information is separated into first registry information that is common to a plurality of applications running on said plurality of heterogeneous servers and second registry information that is specific to ones of said plurality of applications, wherein said first registry information is stored in a common registry and said second registry information is stored in respective second registries associated with respective applications;

constructing means, responsive to receiving a request to authenticate a user in said database registry, for constructing a credential of the user; and accessing means for selectively allowing access to a resource based on the credential of the user and a protection policy applied to the resource in an object name space associated with a first server if said plurality of servers.

15. A computer program product stored in a computer-readable medium for sharing registry information among a plurality of heterogeneous servers, comprising:

instructions for creating a database registry such that registry information is separated into first registry information that is common to a plurality of applications running on said plurality of heterogeneous servers and second registry information that is specific to ones of said plurality of applications, wherein said first registry information is stored in a common registry and said second registry information is stored in respective second registries associated with respective applications;

instructions, responsive to receiving a request to authenticate a user in said database registry, for constructing a credential of the user; and instructions for selectively allowing access to a resource based on the credential of the user and a protection policy applied to the resource in an object name space associated with a first server of said plurality of users.

16. The computer program product as recited in claim 15, wherein the said credential of the user is constructed using a user identifier and a user password.

17. The computer program product as recited in claim 15, wherein registry information in said database registry includes at least one of user registry information and group registry information.

18. The computer program product as recited in claim 15, access to the database registry must go through an adapter.

19. The computer program product as recited in claim 18, wherein the adapter is a user registry adapter.

20. The computer program product as recited in claim 15, further comprising:

instructions for storing a definition of the user in said database registry.

21. The computer program product as recited in claim 15, further comprising:

instructions for protecting application specific data from unauthorized users.

22. The computer program product as recited in claim 15, wherein said respective second database is a meta-data database.

23. The computer program product as recited in claim 15, wherein the resource is a Web resource.

24. The computer program product as recited in claim 15, further comprising:

instructions, responsive to a request to disable a user from accessing a given resource, for receiving the disable request at an adapter integrating the plurality of servers; and instructions for removing a definition associated with the user from a database associated with the second server.

25. The computer program product as recited in claim 15, further comprising:

instructions, responsive to a request to disqualify a user from accessing a given resource, for receiving the disqualification request at an adapter integrating the plurality of servers;

instructions for removing a definition associated with the user from a first database associated with the second server; and instructions for removing a definition associated with the user from a second database associated with the second server.

26. The computer program product as recited in claim 25, wherein the first database is a registry database and the second database is a meta-data database.

* * * * *